(12) United States Patent
Lewis et al.

(10) Patent No.: US 8,551,327 B2
(45) Date of Patent: Oct. 8, 2013

(54) STAGED CO-PROCESSING OF BIOFEEDS FOR MANUFACTURE OF DIESEL RANGE HYDROCARBONS

(75) Inventors: Ernie Lewis, Baton Rouge, LA (US); Tahmid Mizan, Bridgewater, NJ (US); Zhiguo Hou, Narazeth, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 502 days.

(21) Appl. No.: 12/316,747

(22) Filed: Dec. 16, 2008

(65) Prior Publication Data

US 2009/0166256 A1    Jul. 2, 2009

Related U.S. Application Data

(60) Provisional application No. 61/009,227, filed on Dec. 27, 2007.

(51) Int. Cl.
*C10G 65/04* (2006.01)
*C10G 65/10* (2006.01)
*C10G 45/02* (2006.01)

(52) U.S. Cl.
USPC .............. 208/210; 208/59; 208/89; 208/211; 208/212; 208/213

(58) Field of Classification Search
USPC ................. 208/46, 133, 177, 208 R, 209, 59, 208/89, 210–213
See application file for complete search history.

(56) References Cited

U.S. PATENT DOCUMENTS

| 4,864,067 | A  | * | 9/1989 | Harandi et al. ........... 208/216 R |
|-----------|----|---|--------|--------------------------------------|
| 4,886,594 | A  | * | 12/1989 | Miller ....................... 208/216 R |
| 4,992,605 | A  |   | 2/1991 | Craig et al. |
| 7,781,629 | B2 | * | 8/2010 | Marchand et al. ........ 208/208 R |
| 7,803,269 | B2 | * | 9/2010 | Kokayeff et al. ............. 208/134 |
| 2003/0221994 | A1 | | 12/2003 | Ellis et al. |
| 2011/0047862 | A1 | | 3/2011 | Mayeur et al. |

FOREIGN PATENT DOCUMENTS

| EP | 1 640 437 A1 | 3/2006 |
| EP | 1 728 844 A1 | 12/2006 |
| EP | 1 741 767 A1 | 1/2007 |
| EP | 1 741 768 A1 | 1/2007 |
| EP | 1741768 A1 * | 1/2007 |
| EP | 1 396 531 B1 | 3/2007 |
| EP | 1 693 432 B1 | 9/2009 |
| EP | 1 681 337 B1 | 12/2010 |
| WO | 2004/022674 A1 | 3/2004 |
| WO | 2007125332 | 11/2007 |
| WO | 2008087269 | 7/2008 |
| WO | 2008087279 | 7/2008 |
| WO | 2009082366 | 7/2009 |

OTHER PUBLICATIONS

George W. Huber, Paul O'Conner and Avelino Corma, "Processing biomass in conventional refineries: Production of high diesel by hydrotreating vegetable oils in heavy vacuum oil mixtures", Applied Catalysis A: General, vol. 329, Aug. 14, 2007, pp. 120-129.

* cited by examiner

*Primary Examiner* — Randy Boyer
(74) *Attorney, Agent, or Firm* — Lawrence E. Carter; Bruce M. Bordeton (57) ABSTRACT

Processes are provided for producing a diesel fuel product having a sulfur content of 10 ppm by weight or less from feed sources that include up to 20% by weight of a biocomponent feedstock. The mineral hydrocarbon portions of the feed sources can be distillate or heavier feed sources.

18 Claims, 4 Drawing Sheets

STAGED CO-PROCESSING OF BIOFEEDS FOR MANUFACTURE OF DIESEL RANGE HYDROCARBONS

CROSS REFERENCE TO RELATED APPLICATIONS

This application claims the benefit of U.S. Provisional 61/009,227 filed Dec. 27, 2007.

FIELD OF THE INVENTION

This invention provides a process for the manufacture of diesel range hydrocarbons that are low in sulfur and that include up to 20% by weight of a biocomponent feedstock. Particularly the invention relates to a staged co-hydrotreating process for the manufacture of diesel range hydrocarbons from at least one biocomponent feedstock and at least one mineral hydrocarbon feedstock.

BACKGROUND OF THE INVENTION

Environmental interests, governmental regulations and incentives, and an increasing worldwide demand for energy are resulting in increased interest in renewable energy sources, such as hydrocarbon fuels derived from biological raw materials. In the manufacture of diesel fuels, one area of interest has been production of suitable diesel fuel via processing of vegetable oils and animal fats that contain triglycerides of fatty acids. Triglycerides contain three linear and mostly saturated hydrocarbon chains (normally 8 to 22-carbon atoms) that are linked together by an ester backbone. When the ester backbone is removed, the remaining linear hydrocarbon chains correspond chemically to hydrocarbons typically present in mineral (i.e., conventional) diesel fuels.

One conventional approach for converting vegetable oils or other fatty acid derivatives into liquid fuels in the diesel boiling range is by a transesterification reaction with an alcohol in the presence of a catalyst, such as sodium hydroxide. The obtained product is a fatty acid alkyl ester, and typically is a fatty acid methyl ester (FAME). While fatty acid alkyl esters have many desirable qualities, such as high cetane, there are issues associated with their use directly as diesel fuels. Fatty acid alkyl esters typically have poor cold flow properties due to a large weight percentage of straight chain hydrocarbons. Additionally, fatty acid alkyl esters often have low oxidation stability related to the presence of ester moieties and unsaturated carbon-carbon bonds.

Hydrogenation of vegetable oils or other fatty acid derivatives by co-processing with mineral diesel feedstocks is another approach for conversion of biologically derived feeds to hydrocarbon liquids in the diesel boiling range. This method removes undesirable oxygen by hydrodeoxygenation or hydrodecarboxylation reactions, and saturates the unsaturated carbon-carbon bonds present in feed molecules. Hydrodeoxygenation and/or hydrodecarboxylation reactions are in many ways similar to other forms of hydrotreating currently used in refining of mineral hydrocarbon feedstocks, and therefore can potentially be practiced using existing infrastructure. However, hydrodeoxygenation reactions are highly exothermic relative to hydrodesulfurization and also require relatively large amounts of hydrogen. The excess heat generated by the hydrodeoxygenation reaction combined with the high levels of required hydrogen can lead to undesirably high reaction temperatures or low hydrogen availability in the feed stream during hydroprocessing. These undesirable conditions can lead to increased formation of unwanted side reaction products and coking of catalyst. Unwanted side reactions, such as cracking, polymerization, ketonization, cyclization and aromatization decrease the yield and the beneficial properties of a diesel fraction. Additionally, unsaturated feeds and free fatty acids in triglyceridic biologically derived oils may also promote the formation of high molecular weight compounds that are not desirable in a diesel fuel. Therefore, there is a need for an improved process for refinery hydrotreatment of hydrocarbon streams that include a biologically derived feedstock, such as vegetable oils and/or animal fats.

Still another conventional approach to producing a diesel fuel including a biologically derived feedstock is to separately process both a mineral hydrocarbon feedstock and the biologically derived feedstock. The processed feedstocks can then be blended to produce a desired diesel fuel. While separate processing allows preferred conditions to be selected for each feedstock individually, this strategy requires significant additional equipment footprint in a refinery, as dedicated process trains are required for both feedstocks. Thus, this solution is not favorable from a cost standpoint.

Separately, regulatory requirements continue to reduce the level of sulfur that is permitted in diesel fuels. In order to meet worldwide regulatory standards, processes are needed that allow for production of diesel fuel with 10 ppm or less of sulfur.

EP 1693432 describes a process for production of a diesel fuel that includes hydrotreatment of a feedstock containing from 1-75% of a vegetable oil, with the balance of the feedstock being a mineral hydrocarbon feed. The mixed feedstock of vegetable and mineral oil is co-processed in at least one hydrotreatment stage. Sulfur levels in the resulting diesel fuel are not disclosed in EP 1693432.

U.S. Pat. No. 4,992,605 describes a process for hydrotreating various types of oils of biological origin for use as diesel fuel extenders. The hydrotreated oils are then separated and diesel component is removed for mixing with a conventional diesel fuel.

EP 1741768 describes a process for producing diesel range hydrocarbons from bio oils and fats. The feedstock for processing includes a bio oil or fat and a diluting agent. The diluting agent can be a traditional hydrocarbon stream. The combined bio oil or fat and diluting agent feedstock is then passed into a reactor at two different location. The first bio oil or fat and diluting agent stream enters the reactor above the first reaction bed, while the second stream, also containing bio oil or fat and diluting agent, enters the reactor downstream from the first reaction bed.

SUMMARY OF THE INVENTION

In an embodiment, a method is provided for producing a low sulfur diesel product. The method includes hydrotreating a mineral hydrocarbon feedstock having an initial boiling point of about 300° F. or greater and an initial sulfur level of at least about 50 ppm by weight in a first reaction zone under effective hydrotreating conditions to produce a treated mineral hydrocarbon feedstock having a sulfur content greater than about 10 ppm but less than about 50 ppm by weight. The treated mineral hydrocarbon feedstock is mixed with a biocomponent feedstock to produce a combined feedstock, the biocomponent feedstock comprising up to about 20% by weight of the combined feedstock. The combined feedstock is then hydrotreated in a second reaction zone under effective hydrotreating conditions to produce a diesel boiling range product having a sulfur content of about 10 ppm by weight or less.

DETAILED DESCRIPTION OF THE PREFERRED EMBODIMENTS

This invention provides processes for producing diesel fuels that include up to 20% by weight of a biocomponent feedstock and also have sulfur levels of 10 ppm or less. This combination of properties is achieved by several differing embodiments, with each embodiment having its own advantages for achieving the desired goals.

In one embodiment, the goals of the invention are achieved by staging the introduction of the mineral hydrocarbon feedstock and the biocomponent feedstock into a single reactor having multiple reaction zones. In such an embodiment, the first reaction zone is operated under hydrodesulfurization conditions to reduce the sulfur level of the treated mineral hydrocarbon feedstock to about 50 ppm or less. Preferably, the sulfur content of the treated mineral hydrocarbon feedstock is greater than 10 ppm by weight. Preferably, the nitrogen content of the treated mineral hydrocarbon feedstock is also reduced. The biocomponent feedstock is then added to the treated mineral feedstock, and the combined feedstock is exposed to a hydrotreating stage in the second reaction zone. Preferably, the biocomponent feedstock can comprise up to 20% by weight of the total weight of the combined feedstocks. This embodiment provides the advantage that diesel fuel containing 10 ppm by weight or less of sulfur can be manufactured using current catalyst technology without having to resort to increased pressures and/or excess hydrogen consumption.

In still another embodiment, the goals of the invention are achieved by staging the introduction of the mineral hydrocarbon and biocomponent feedstocks in a reaction system having multiple reactors that include a hydrotreatment stage. In such an embodiment, the mineral hydrocarbon feedstock is introduced into a first reactor, or series of reactors, that include at least one hydrotreatment stage. The one or more hydrotreatment stages in the first reactor or series of reactors reduces the sulfur content of the mineral hydrocarbon feedstock to about 50 ppm by weight or less. Preferably, the sulfur content of the treated mineral hydrocarbon feedstock is greater than 10 ppm. Preferably, the nitrogen content of the treated mineral hydrocarbon feedstock is also reduced. The treated mineral hydrocarbon feedstock is then combined with up to 20% by weight (relative to the total weight of the combined streams) of biocomponent feedstock. The combined feedstocks are passed into at least one additional reactor that includes a hydrotreatment stage. The combined feedstocks are exposed to hydrotreating conditions for reducing the sulfur content to less than 10 ppm by weight and for deoxygenating the biocomponent portion of the combined feedstocks. This embodiment provides the advantage that diesel fuel containing 10 ppm by weight or less of sulfur can be manufactured using current catalyst technology without having to resort to increased pressures and/or excess hydrogen consumption. This embodiment also provides the advantage that a broader range of temperature and pressure conditions can be selected for each hydrotreatment stage because each stage is in a separate reactor, which can assist with maintaining a desired temperature during deoxygenation of the biocomponent feedstock.

In the discussion below, a biocomponent feedstock refers to a hydrocarbon feedstock derived from a biological raw material component, such as vegetable oil or animal fat. The vegetable oils and animal fats that can be used in the present invention include any of those which comprise primarily triglycerides and free fatty acids (FFA). The triglycerides and FFAs contain aliphatic hydrocarbon chains in their structure having 8-24 carbons. Examples of biocomponent feedstocks include but are not limited to canola oil, corn oil, soy oils, castor oil, and palm oil.

A mineral hydrocarbon feedstock refers to a hydrocarbon feedstock derived from crude oil that has optionally been subjected to one or more separation and/or other refining processes. Preferably, the mineral hydrocarbon feedstock is a petroleum feedstock boiling in the distillate range or above. Such a feedstock typically has a boiling range from about 150° C. to about 450° C., preferably from about 175° C. to about 400° C. Alternatively, the feedstock can be characterized in terms of the boiling points at which various fractions of the feedstock will boil at. For example, the T5 boiling point refers to the temperature at which 5 percent of the feedstock will boil, while the T95 boiling point refers to the temperature at which 95 percent of the feedstock will boil. In an embodiment, the feedstock has a T5 boiling point of at least about 300° F. In another embodiment, the feedstock has a T95 boiling point of about 775° F. or less, preferably 725° F. or less. In various embodiments, the feedstock contains greater than about 50 wppm sulfur, or greater than about 0.1 wt % sulfur, or greater than about 0.25 wt % sulfur, or greater than about 0.5 wt % sulfur, or greater than about 1 wt % sulfur, or greater than about 2 wt % sulfur prior to processing according to the invention. Examples of suitable feedstocks include virgin distillates, hydrotreated virgin distillates, light gas oils, heavy gas oils, light catalytic cycle oils, light cycle oils, and vacuum gas oils.

Co-processing of biocomponent feedstock with a conventional distillate or other mineral hydrocarbon feedstock is one option for the manufacture of renewable diesel using existing refinery equipments. However, biocomponent feedstocks, such as vegetable oils and animal fats, typically contain triglycerides and fatty acids. Addition of biocomponent feedstocks into conventional distillates inhibits catalytic hydrodesulfurization of conventional hydrotreating catalysts (e.g. CoMo supported on alumina). Without being bound by any particular theory, it is believed that two factors contribute to the catalytic inhibition. First, the large triglyceride and fatty acid molecules in biocomponent feedstocks may competitively adsorb on and block active sites of hydrotreating catalysts. This competitive adsorption reduces the active sites available for hydrodesulfurization. As a result, co-processing of biocomponent feedstocks slows the kinetics of hydrodesulfurization. If this change in kinetics is not compensated for, co-processing of mineral hydrocarbon feedstock with a biocomponent feedstock can result in an increase in the sulfur concentration of the treated feedstock, as compared to the sulfur concentration resulting from treatment of only the mineral hydrocarbon feedstock. Second, hydrodeoxygenation of biocomponent feedstocks is believed to produce increased levels of CO relative to hydroprocessing of a mineral hydrocarbon feedstock. The increased levels of CO produced during hydrodeoxygenation are also believed to inhibit catalytic activity of hydrodesulfurization catalysts.

In an embodiment, the inhibition of catalytic hydrodesulfurization is overcome by partially hydrodesulfurizing a mineral feedstock prior to combining the mineral feedstock with the biocomponent feedstock. Thus, in some embodiments the inhibition of catalytic hydrodesulfurization is minimized by first hydrotreating a mineral hydrocarbon feedstock to have a sulfur content of about 50 ppm by weight or less, combining the treated feedstock with a biocomponent feedstock, and then hydrotreating the combined feedstocks to produce a diesel fuel with 10 ppm by weight or less of sulfur. The hydrotreatment of the combined feedstocks also results in deoxygenation and saturation of double bonds in the biocomponent portion of the combined feedstocks. Additionally, the diesel fuel produced from the combined feedstocks will have an improved cetane number relative to a diesel fuel produced from only the mineral hydrocarbon feedstock. This is believed to be due to the linear paraffins that are derived from the biocomponent feedstock during deoxygenation.

In an embodiment, the biocomponent portion of the feedstock is substantially deoxygenated. This corresponds to removing at least 90%, or at least 95%, or at least 98%, or at least 99% of the oxygen present in the combined mineral and biocomponent feedstock. Alternatively, substantially deoxygenating the feedstock can correspond to reducing the oxygenate level of the total feedstock to 0.1 wt % or less, or 0.05 wt % or less, or 0.01 wt % or less, or 0.005 wt % or less.

Two types of feed covered by the current invention are mineral distillates and bio-feeds (feeds of bio-origin). In terms of overall liquid volume, the portion of biocomponent feed is from 0.1% to 50% of total feed volume, preferably 0.1% to 20% of total feed volume. Alternatively, the portion of biocomponent feed can be expressed as a weight percentage. In an embodiment, the portion of biocomponent feed is from 0.1% to 50% by weight of the total feed weight, preferably 0.1% to 20% of the total feed weight. Preferably, in the embodiments described below, the reactors and reaction zones are operated in a co-current manner.

Staged Introduction of Feedstocks in a Multi-Bed Hydrotreatment Reactor

In the following group of embodiments, a mineral hydrocarbon feedstock and a biocomponent feedstock are introduced into separate reaction zones of a reactor. Preferably, the mineral hydrocarbon feedstock is a diesel boiling range feedstock. The mineral hydrocarbon feedstock is introduced into a first reaction zone that includes one or more catalyst beds that contain a hydrotreatment catalyst. The hydrocarbon feedstock is exposed to each catalyst bed while being exposed to hydrodesulfurization conditions. In this first reaction zone, the sulfur level of the mineral hydrocarbon feedstock is reduced to about 50 ppm by weight or less.

The catalyst in the first reaction zone can be a conventional hydrotreating catalyst, such as a catalyst composed of a Group VIB metal and/or a Group VIII metal on a support. Suitable metals include cobalt, nickel, molybdenum, tungsten, and combinations thereof. Suitable supports include silica, silica-alumina, alumina, and titania. Unsupported (bulk metal) catalysts composed of Group VIB and/or Group VIII metals can also be used in the first reaction zone.

The reaction conditions in the first reaction zone can be conditions suitable for reducing the sulfur content of the feedstream to about 50 ppm by weight or less as the feedstream is exposed to the catalyst beds in the reaction zone. The reaction conditions can include 0.25-1.5 LHSV, 250-1000 psig total pressure, 150-800 psig hydrogen partial pressure, a treat gas rate of about 500-1500 scf/b of at least 80% hydrogen (remainder inert gas), and temperatures of 550-750° F.

After hydrotreatment, the output stream (treated mineral hydrocarbon feedstock) from the first reaction zone is passed to a mixing zone where it is mixed with a biocomponent feedstock. Preferably, the biocomponent feedstock is introduced into the mixing zone without prior hydrotreating. The biocomponent feedstock is mixed with the treated mineral hydrocarbon feedstock to produce a combined feedstock. Optionally, the biocomponent feedstock can be introduced into the mixing zone at a desired temperature by pre-heating the biocomponent feedstock. In another embodiment, a hydrogen-containing make-up gas can also be introduced into the mixing zone.

In an alternative embodiment, the biocomponent feedstock can also include a portion of a non-biocomponent hydrocarbon feedstock (such as another mineral hydrocarbon feedstock). In such an embodiment, the total sulfur content of the biocomponent and non-biocomponent feedstock is low enough that the combined feedstock leaving the mixing zone will have a sulfur content of about 50 ppm by weight or less. Note that in embodiments where the biocomponent feedstock is diluted with a non-biocomponent feedstock, the goal is still to produce a combined feedstock leaving the mixing zone having a biocomponent portion of 20% by weight or less. Thus, if the biocomponent feedstock includes 33% by weight of a non-biocomponent portion, then up to 30% by weight of the stream containing the biocomponent portion could be added to the treated mineral hydrocarbon feedstock in the mixing zone.

The combined feedstock from the mixing zone is then passed into a second hydrotreating zone. The second hydrotreating zone includes one or more catalyst beds containing a hydrotreating catalyst. The combined feedstock contacts the hydrotreating catalyst in the second hydrotreating zone under hydrodeoxygenation and hydrodesulfurization conditions. This causes deoxygenation, desulfurization, and olefin saturation in the combined feedstock. The output stream from the second hydrotreating zone is a diesel fuel with an improved cetane number and a sulfur content of 10 ppm by weight or less.

The catalyst in the second reaction zone can be a catalyst composed of a Group VIB metal and/or a Group VIII metal on a support. Suitable metals include cobalt, nickel, molybdenum, tungsten and combinations thereof. Suitable supports include silica, silica-alumina, alumina, titania, and combinations thereof. Unsupported (bulk metal) catalysts composed of Group VIB and/or Group VIII metals can also be used in the second reaction zone.

The reaction conditions in the second reaction zone can be conditions suitable for reducing the sulfur content of the feedstream to about 10 ppm by weight or less as the feedstream is exposed to the catalyst beds in the reaction zone. The reaction conditions can include 0.5-1.5 LHSV, 250-1000 psig total pressure, 150-800 psig hydrogen partial pressure, and temperatures of 550-750° F.

Optionally, the second reaction zone can also include a quench mechanism, where a fluid is introduced into the reaction zone to control reaction temperature. This quench mechanism assists in maintaining a desired temperature in spite of the heat release due to the exothermic nature of hydrodeoxygenation of the biocomponent portion of the feedstock. The quench fluid can be a make-up hydrogen gas stream, an inert gas stream such as nitrogen, or a liquid stream such as a liquid product stream from the second stage.

The output from the second reaction zone can be optionally passed to a separation zone for separation of a vapor phase stream and a liquid phase product stream. After such a separation, the liquid phase product stream can optionally be passed to a hydroisomerization stage. The hydroisomerization stage can be used to further improve the cold-flow properties of the liquid phase product stream.

In the optional hydroisomerization stage, the liquid phase product stream from the second reactor is exposed to one or more reaction zones, optionally present in a separate reactor, that are operated at hydroisomerization conditions in the presence of hydroisomerization catalyst. Suitable hydroisomerization catalysts include conventional hydroisomerization catalysts, such as zeolite or amorphous catalysts impregnated with a noble metal.

In an embodiment where the liquid phase product is hydroisomerized, the hydrogen treat gas used in the hydroisomerization reaction zones may be cascaded back to the first stage of the hydrotreatment reactor.

Figure 1:
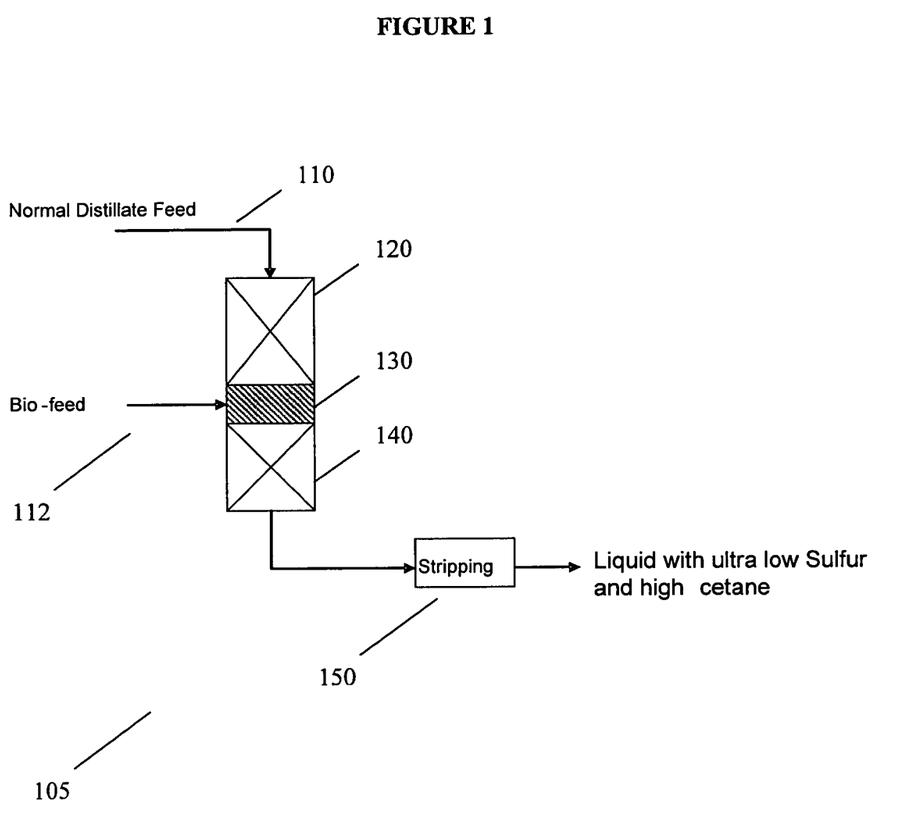
FIG. 1 schematically shows a reaction system for performing a process according to an embodiment of the invention.

A reaction system suitable for carrying out the above processes is shown schematically in FIG. 1. In FIG. 1, a mineral hydrocarbon feedstock 110 is introduced into a first reaction zone 120 of reactor 105. The mineral hydrocarbon feedstock is exposed to hydrotreating conditions in first reaction zone 120 in the presence of one or more catalyst beds that contain hydrotreating catalyst. Preferably, this reduces the sulfur content of the treated feedstock to about 50 ppm by weight or less. The treated feedstock flows into mixing zone 130, where it is combined with biocomponent feedstock 112. The combined feedstock passes into second reaction zone 140, where the combined feedstock is exposed to hydrotreating conditions in the presence of one or more catalyst beds that contain hydrotreating catalyst. This reduces the sulfur content of the treated combined feedstocks to about 10 ppm by weight or less. The embodiment shown in FIG. 1 includes optional stripper 150 for stripping out a gas phase portion of the treated combined feedstocks. The stripped liquid phase product corresponds to a diesel fuel with a high cetane value and low sulfur content.

Biofeed Co-Process Using Multiple Distillate Hydrotreating Reactors

In the following group of embodiments, a mineral hydrocarbon feedstock and a biocomponent feedstock are introduced into separate hydrotreatment reactors. Preferably, the mineral hydrocarbon feedstock is a diesel boiling range feedstock. For convenience, this group of embodiments will be described based on a reaction system containing two hydrotreatment reactors, but those of skill in the art will readily understand how additional reactors could be added either prior to or after mixing of the treated mineral hydrocarbon feedstock and the biocomponent feedstock.

The mineral hydrocarbon feedstock is introduced into a first hydrotreatment reactor that includes one or more catalyst beds that contain a hydrotreatment catalyst. The hydrocarbon feedstock is exposed to each catalyst bed while being exposed to hydrodesulfurization conditions. In this first hydrotreatment reactor, the sulfur level of the mineral hydrocarbon feedstock is reduced to about 50 ppm by weight or less.

The catalyst in the first hydrotreatment reactor can be a conventional hydrotreating catalyst, such as a catalyst composed of a Group VIB metal and/or a Group VIII metal on a support. Suitable metals include cobalt, nickel, molybdenum, tungsten, and combinations thereof. Suitable supports include silica, silica-alumina, alumina, titania, and combinations thereof.

The reaction conditions in the first hydrotreatment reactor can be conditions suitable for reducing the sulfur content of the feedstream to about 50 ppm by weight or less as the feedstream is exposed to the catalyst beds in the reactor. The reaction conditions can include 0.25-1.5 LHSV, 250-1000 psig total pressure, 150-800 psig hydrogen partial pressure, a treat gas rate of about 500-1500 scf/b of at least 80% hydrogen (remainder inert gas), and temperatures of 550-750° F.

After hydrotreatment, the output stream (treated mineral hydrocarbon feedstock) from the first reactor can optionally pass through a separator for removal of gas phase products from the liquid phase product produced in the first hydrotreatment reactor, such as $H_2S$ or $NH_3$. In such an embodiment, the hydrogen flow that passed through the first reactor is also separated from the liquid phase product. This hydrogen flow can optionally be added to a make-up hydrogen flow to serve as a source of hydrogen for the first reactor. Alternatively, this hydrogen flow can optionally be added to the second hydrotreatment reactor.

After passing through the first hydrotreatment reactor, and any optional stripping vessel, the treated mineral hydrocarbon feedstock is mixed with a biocomponent feedstock. Preferably, the biocomponent feedstock has not been previously hydrotreated. The biocomponent feedstock is mixed with the treated mineral hydrocarbon feedstock to produce a combined feedstock. Optionally, the biocomponent feedstock can be heated to a desired temperature by pre-heating the biocomponent feedstock prior to mixing. In another embodiment, a hydrogen-containing make-up gas can also be introduced with the biocomponent feedstock. In an alternative embodiment, the biocomponent feedstock can also include a portion of a non-biocomponent hydrocarbon feedstock (such as another mineral hydrocarbon feedstock). In such an embodiment, the total sulfur content of the biocomponent and non-biocomponent feedstock is low enough that the combined feedstock leaving the mixing zone will have a sulfur content of about 50 ppm by weight or less.

The combined feedstock is then passed into a second hydrotreatment reactor. The second hydrotreatment reactor includes one or more catalyst beds containing a hydrotreating catalyst. The combined feedstock contacts the hydrotreating catalyst in the second hydrotreatment reactor under hydrodeoxygenation and hydrodesulfurization conditions. This causes deoxygenation, desulfurization, and olefin saturation in the combined feedstock. The output stream from the second hydrotreatment reactor is a diesel fuel with an improved cetane number and a sulfur content of 10 ppm by weight or less.

The catalyst in the second hydrotreatment reactor can be a catalyst composed of a Group VIB metal and/or a Group VIII metal on a support. Suitable metals include nickel, molybdenum, tungsten, and combinations thereof. Suitable supports include silica, silica-alumina, alumina, titania, and combinations thereof.

The reaction conditions in the second hydrotreatment reactor can be conditions suitable for reducing the sulfur content of the feedstream to about 10 ppm by weight or less as the feedstream is exposed to the catalyst beds in the reaction zone. The reaction conditions can include 0.5-1.5 LHSV, 250-1000 psig total pressure, 150-800 psig hydrogen partial pressure, and temperatures of 550-750° F.

Optionally, the second hydrotreatment reactor can also include a quench mechanism, where a fluid is introduced into the reaction zone to control reaction temperature. This quench mechanism assists in maintaining a desired temperature in spite of the heat release due to the exothermic nature of hydrodeoxygenation of the biocomponent portion of the feedstock. The quench fluid can be a make-up hydrogen gas stream, an inert gas stream such as nitrogen, a liquid stream such as a liquid product stream of recycled product from the second hydrotreatment reactor, an additional flow of a mineral feedstock, or a combination of two or more of the above types of quench fluids.

The output from the second hydrotreatment reactor can be optionally passed to another separation zone for separation of a vapor phase stream and a liquid phase product stream. After such a separation, the liquid phase product stream can optionally be passed to a hydroisomerization stage. The hydroisomerization stage can be used to further improve the cold-flow properties of the liquid phase product stream.

In the optional hydroisomerization stage, the liquid phase product stream from the second reactor is exposed to one or more reaction zones, optionally present in a separate reactor, that are operated at hydroisomerization conditions in the presence of hydroisomerization catalyst. Suitable hydroisomerization catalysts include conventional hydroisomerization catalysts, such as zeolite or amorphous catalysts impregnated with a noble metal.

Figure 2:
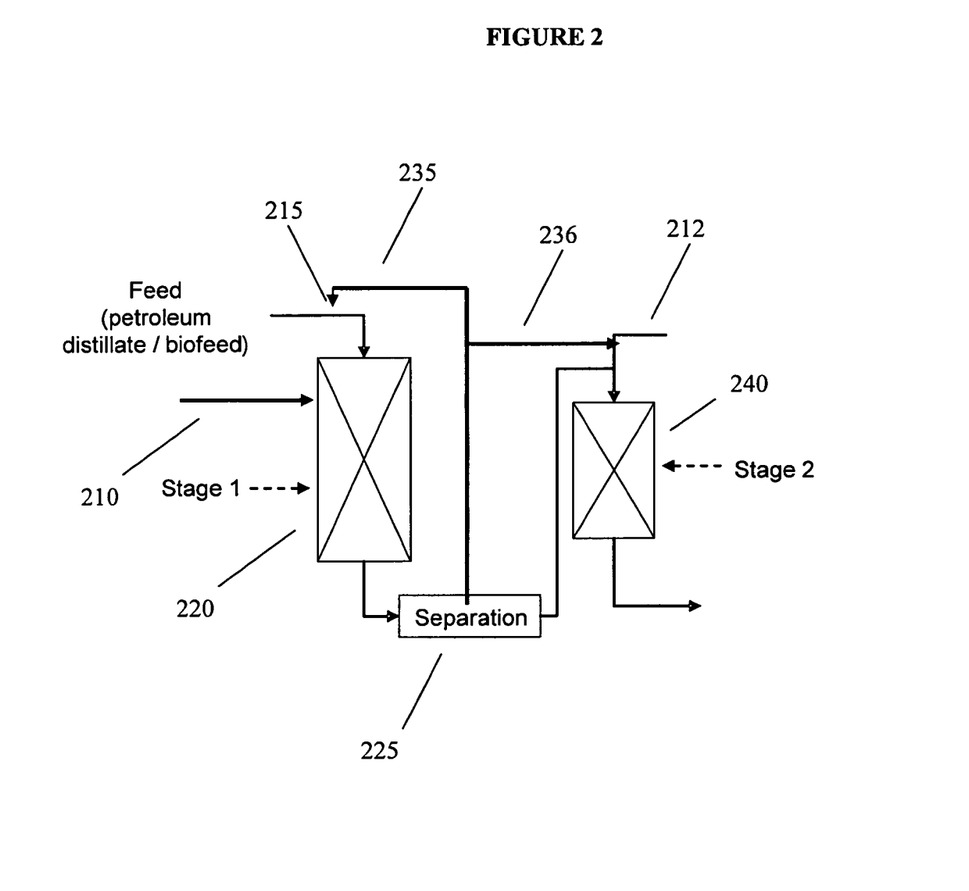
FIG. 2 schematically shows a reaction system for performing a process according to an embodiment of the invention.

A reaction system suitable for carrying out the above processes is shown schematically in FIG. 2. In FIG. 2, a mineral hydrocarbon feedstock 210 is introduced into a first hydrotreatment reactor 220. A hydrogen treat gas stream 215 is also introduced into hydrotreatment reactor 220. The mineral hydrocarbon feedstock is exposed to hydrotreating conditions in first hydrotreatment reactor 220 in the presence of one or more catalyst beds that contain hydrotreating catalyst. Preferably, this reduces the sulfur content of the treated feedstock to about 50 ppm by weight or less. The treated feedstock optionally flows into a separator 225, where gas phase products are separated from liquid phase products. Optionally, a portion of the gas phase products separated by separator 225 may be cascaded back to the first reactor as a recycled hydrogen treat gas stream 235. In such an embodiment, recycled hydrogen treat gas stream 235 is combined with hydrogen treat gas stream 215 prior to entering first hydrotreatment reactor 220. Optionally, a portion of the gas phase products separated by separator 225 may be cascaded to the second reactor as a recycled hydrogen treat gas stream 236.

After passing through first hydrotreatment reactor 220 and optionally separator 225, the treated mineral hydrocarbon feedstock is combined with biocomponent feedstock 212 prior to entering second hydrotreatment reactor 240. The combined feedstock is exposed to hydrotreating conditions in the presence of one or more catalyst beds that contain hydrotreating catalyst. This reduces the sulfur content of the treated combined feedstocks to about 10 ppm by weight or less.

Biofeed Co-Process Using CFHT Reactors

In the following group of embodiments, a mineral hydrocarbon feedstock and a biocomponent feedstock are introduced into separate reaction zones of a reactor. In this group of embodiments, the mineral hydrocarbon feedstock is preferably a heavier feedstock that can be processed to form a product that is partially composed of material suitable for diesel fuel. Examples of such heavier feedstocks include light atmospheric gas oils, heavy atmospheric gas oils, and vacuum gas oils. The mineral hydrocarbon feedstock is introduced into a first reaction zone that includes one or more catalyst beds that contain a hydrotreatment catalyst. The hydrocarbon feedstock is exposed to each catalyst bed while being exposed to catalytic feed hydrotreatment conditions.

The catalyst in the first reaction zone can be a conventional hydrotreating catalyst, such as a catalyst composed of a Group VIB metal and/or a Group VIII metal on a support. Suitable metals include cobalt, nickel, molybdenum, tungsten, and combinations thereof. Suitable supports include silica, silica-alumina, alumina, titania, and combinations thereof.

The reaction conditions in the first reaction zone can be conditions suitable for catalytic feed hydrotreatment. The reaction conditions can include 0.25-1.5 LHSV, 1500-2500 psig total pressure, and 900-2200 psig hydrogen partial pressure.

After hydrotreatment, the output stream (treated mineral hydrocarbon feedstock) from the first reaction zone is passed to a mixing zone where it is mixed with a biocomponent feedstock. Preferably, the biocomponent feedstock is introduced into the mixing zone without prior hydrotreating. The biocomponent feedstock is mixed with the treated mineral hydrocarbon feedstock to produce a combined feedstock. Optionally, the biocomponent feedstock can be introduced into the mixing zone at a desired temperature by pre-heating the biocomponent feedstock. In another embodiment, a hydrogen-containing make-up gas can also be introduced into the mixing zone. In an optional embodiment, the biocomponent feedstock can also include a portion of a non-biocomponent hydrocarbon feedstock (such as another mineral hydrocarbon feedstock).

The combined feedstock from the mixing zone is then passed into a second hydrotreating zone. The second hydrotreating zone includes one or more catalyst beds containing a hydrotreating catalyst. The combined feedstock contacts the hydrotreating catalyst in the second hydrotreating zone under catalytic feed hydrotreating conditions. This causes deoxygenation, desulfurization, and olefin saturation in the combined feedstock. The output stream from the second hydrotreating zone is a diesel fuel with an improved cetane number and a sulfur content of 10 ppm by weight or less.

The catalyst in the second hydrotreatment reactor can be a catalyst composed of a Group VIB metal and/or a Group VIII metal on a support. Suitable metals include nickel, molybdenum, tungsten, and combinations thereof. Suitable supports include silica, silica-alumina, alumina, titania, and combinations thereof. The reaction conditions in the second reaction zone can be similar to the first reaction zone, and suitable for reducing the sulfur content of the feedstream to about 10 ppm by weight or less as the feedstream is exposed to the catalyst beds in the reaction zone.

Optionally, the second reaction zone can also include a quench mechanism, where a fluid is introduced into the reaction zone to control reaction temperature. This quench mechanism assists in maintaining a desired temperature in spite of the heat release due to the exothermic nature of hydrodeoxygenation of the biocomponent portion of the feedstock. The quench fluid can be a make-up hydrogen gas stream, an inert gas stream such as nitrogen, a liquid stream such as a liquid product stream of recycled product from the second hydrotreatment reactor, an additional flow of a mineral feedstock, or a combination of two or more of the above types of quench fluids.

The output from the second reaction zone is passed to a fractionator for separation of lighter and heavier components. Because the initial feedstock was a gas oil or another component with a boiling range above the diesel range, only a portion of the output from the second reaction zone is suitable for use as diesel fuel. The fractionator separates the portion of the second reaction zone output that corresponds to a diesel boiling range product from the heavier and lighter components.

After fractionation, the diesel boiling range product is passed to a distillate hydroprocessing reactor or reactors. The distillate hydroprocessing reactor can include reaction zones for any type of hydroprocessing typically performed during manufacture of diesel fuel, so long as the final diesel fuel product has a sulfur content of 10 ppm by weight or less. Such hydroprocessing steps can include hydrodesulfurization, hydroisomerization, and/or hydrofinishing.

Figure 3:
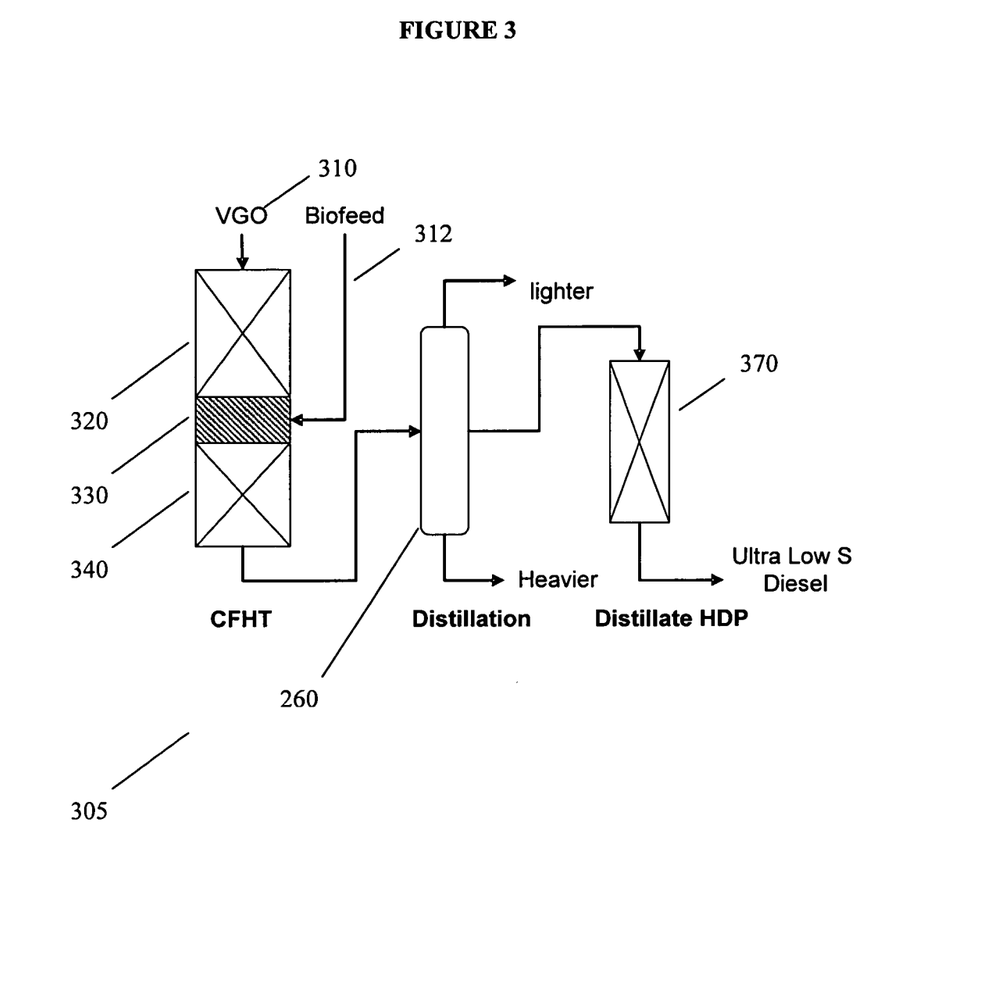
FIG. 3 schematically shows a reaction system for performing a process according to an embodiment of the invention.

A reaction system suitable for carrying out the above processes is shown schematically in FIG. 3. In FIG. 3, a mineral hydrocarbon feedstock 310 is introduced into a first reaction zone 320 of reactor 305. The mineral hydrocarbon feedstock is exposed to catalytic feed hydrotreating conditions in first reaction zone 320 in the presence of one or more catalyst beds that contain hydrotreating catalyst. The treated feedstock flows into mixing zone 330, where it is combined with biocomponent feedstock 312. The combined feedstock passes into second reaction zone 340, where the combined feedstock is exposed to catalytic feed hydrotreating conditions in the presence of one or more catalyst beds that contain hydrotreating catalyst. The output from the catalytic feed hydrotreatment zones is passed to a fractionator 360, where the output is separated into a diesel boiling range product, a lighter product (i.e., lighter than diesel boiling range), and a heavier product. The diesel boiling range product is then sent to a distillate hydroprocessing reactor 370 for any final hydroprocessing steps that are desired for manufacture of 10 ppm by weight or less diesel fuel.

Biofeed Co-Process Using Two-Stage HDC Reactors

In FIG. 3, a single reactor 305 is used to perform catalytic feed hydrotreating on a gas oil or other feed that is heavier than a typical diesel boiling range feed. Alternatively, a dual reactor hydrocracking reaction system can be used to process a heavier feed.

Figure 4:
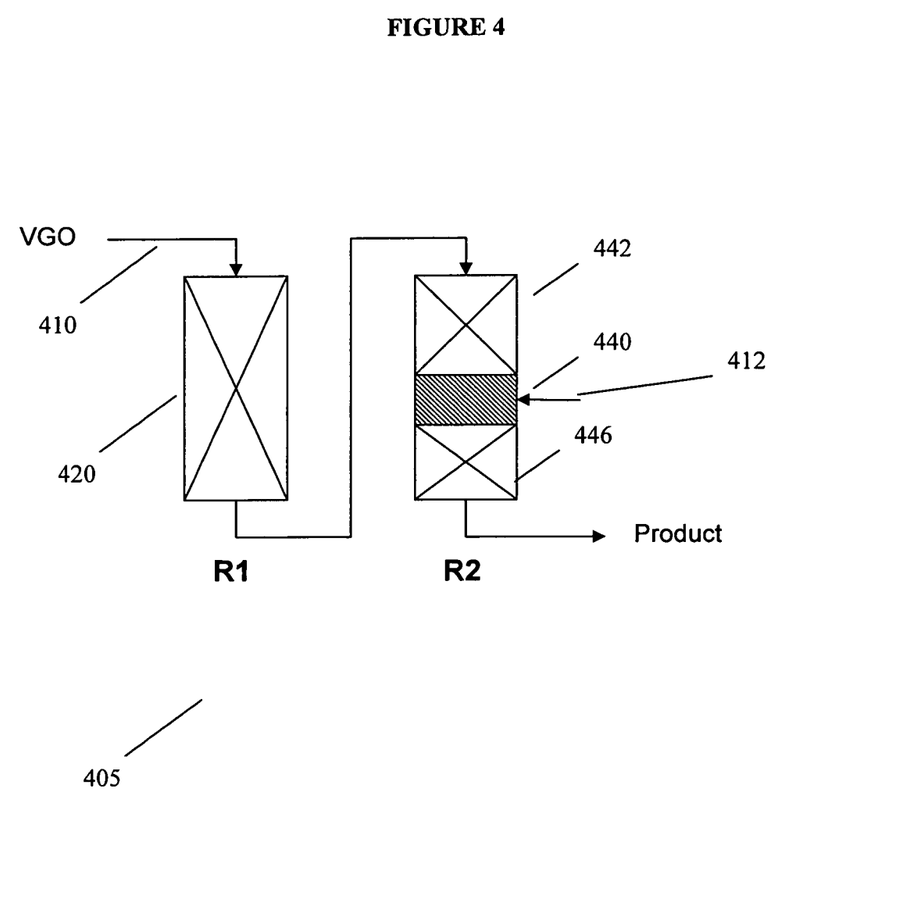
FIG. 4 schematically shows a reaction system for performing a process according to an embodiment of the invention.

FIG. 4 schematically shows a two stage hydrocracker 405. The two stage hydrocracker 405 can be used in place of a catalytic feed hydrotreatment reactor 305 in reaction systems such as the one shown in FIG. 3. Hydrocracker 405 includes a first hydrocracking reactor 420 and a second hydrocracking reactor 440. In FIG. 4, a mineral hydrocarbon feedstock 410 is passed into hydrocracking reactor 420. Hydrocracking reactor 420 includes one or more catalyst beds that contain hydrocracking catalyst. Feedstock 410 is exposed to the catalyst beds under hydrocracking conditions to produce a partially hydrocracked feedstock.

The partially hydrocracked feedstock is passed first reaction zone 442 of second hydrocracking reactor 440. The partially hydrocracked feedstock is further exposed to hydrocracking catalyst under hydrocracking conditions in first reaction zone 442. The product exiting from first reaction zone 442 is combined with a biocomponent feedstock in mixing zone 444. The combined feedstock then passes into second reaction zone 446, where it is exposed to a hydrocracking catalyst under hydrocracking conditions. The resulting product exiting from second reaction zone 446 can then be passed to suitable further processing zones such as a fractionator 360 as shown in FIG. 3.

What is claimed is:

1. A method for producing a low sulfur diesel product, comprising:
    hydrotreating a mineral hydrocarbon feedstock having an initial boiling point of about 300° F. or greater and an initial sulfur level of at least about 50 ppm by weight in a first reaction zone under effective hydrotreating conditions to produce a treated mineral hydrocarbon feedstock having a sulfur content greater than about 10 ppm but less than about 50 ppm by weight;
    mixing the treated mineral hydrocarbon feedstock with a biocomponent feedstock to produce a combined feedstock, the biocomponent feedstock comprising up to about 20% by weight of the combined feedstock; and
    hydrotreating the combined feedstock in a second reaction zone under effective hydrotreating conditions to produce a diesel boiling range product having a sulfur content of about 10 ppm by weight or less, wherein the diesel boiling range product is stripped to remove has phase impurities.

2. The method of claim 1, wherein the biocomponent feedstock comprises palm oil.

3. The method of claim 1, wherein the mineral hydrocarbon feedstock has T95 boiling point of 775° F. or less.

4. The method of claim 1, wherein the mineral hydrocarbon feedstock is an atmospheric gas oil, a vacuum gas oil, or a light cycle oil.

5. The method of claim 1, wherein the biocomponent feedstock comprises a biocomponent portion and a mineral hydrocarbon diluent.

6. The method of claim 1, wherein the mineral hydrocarbon feedstock has a T5 boiling point of at least 300° F.

7. The method of claim 1, further comprising hydroisomerizing the diesel boiling range product.

8. The method of claim 1, wherein the first reaction zone and second reaction zone are contained within a single reactor.

9. The method of claim 1, wherein at least 95 wt % of the oxygen is removed from the combined feedstock.

10. The method of claim 1, wherein at least 98 wt % of the oxygen is removed from the combined feedstock.

11. The method of claim 1, wherein the oxygen content of the diesel boiling range product is 0.1 wt % or less.

12. The method of claim 1, wherein the oxygen content of the diesel boiling range product is 0.01 wt % or less.

13. The method of claim 1, wherein the first effective hydrotreating conditions include an LHSV of 0.25-1.5, 250-1000 psig total pressure, 150-800 psig hydrogen partial pressure, a treat gas rate of about 500-1500 scf/b of at least 80% hydrogen (remainder inert gas), and temperatures of 550-750° F.

14. The method of claim 1, wherein the first effective hydro eating conditions comprise effective hydrocracking conditions.

15. The method of claim 1, wherein the first effective hydrotreating conditions comprise effective catalytic feed hydrotreatment conditions.

16. The method of claim 1, wherein the second effective hydotreating conditions include an LHSV of 0.5-1.5, 250-1000 psig total pressure, 150-800 psig hydrogen partial pressure, and temperatures of 550-750° F.

17. The method of claim 1, wherein the second effective hydrotreating conditions comprise effective catalytic feed hydrotreatment conditions.

18. The method of claim 1, wherein the sulfur content of the mineral hydrocarbon feedstock is 0.25 wt % or greater.

* * * * *